April 11, 1967  E. ALLGAIER ETAL  3,313,108
HYDROSTATIC TORQUE CONVERTER

Filed Oct. 20, 1966  4 Sheets-Sheet 1

INVENTORS
ERWIN ALLGAIER
KASPAR RITTER
BY
ATTORNEY.

April 11, 1967   E. ALLGAIER ETAL   3,313,108
HYDROSTATIC TORQUE CONVERTER
Filed Oct. 20, 1966   4 Sheets-Sheet 3

INVENTORS
ERWIN ALLGAIER
KASPAR RITTER
BY *Ernest Montague*

ATTORNEY.

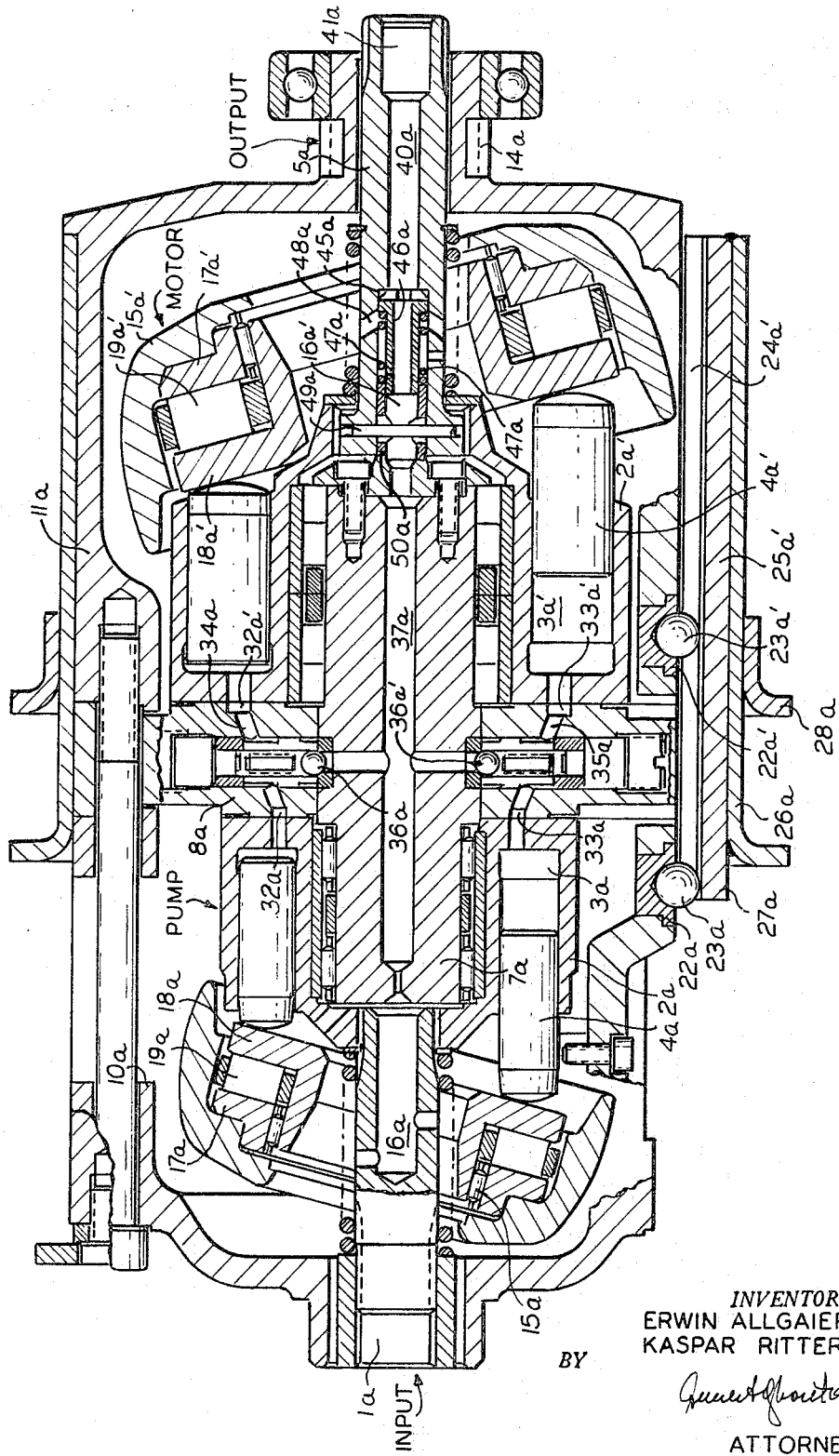

3,313,108
HYDROSTATIC TORQUE CONVERTER

Erwin Allgaier, Boll, Kreis Goppingen, and Kaspar Ritter, Kirchheim, Germany, assignors to Kopat Gesellschaft fur Konstruktion Entwicklung und Patentverwertung m.b.H. & Co. KG, Boll, Kreis Goppingen, Germany, a corporation of Germany
Filed Oct. 20, 1966, Ser. No. 596,368
Claims priority, application Germany, Nov. 28, 1964, K 54,652
9 Claims. (Cl. 60—53)

This is a continuation-in-part application to the co-pending application Ser. No. 447,832 filed Apr. 13, 1965, now abandoned.

The present invention relates to a hydrostatic torque converter.

Torque converters are known already, each of which comprises an axial piston pump and an axial piston motor, the parts of which are disposed like a mirror-image relative to an intermediate control disc, whereby swinging bodies thereof are swingably mounted in a joint, rotary housing receiving also the control disc by means of a control pot displaceable in axial direction on the rotary housing.

It is one object of the present invention to provide a hydrostatic torque converter which reduces the adjustment forces required for the variation of the transmission ratio with simultaneous improvement of the adjustment exactness, as well as to simplify and to economize the production of the converters along with improved function and increased operational life.

It is a further object of the present invention to provide a hydrostatic torque converter, wherein each of the swinging bodies has two swinging arms disposed in a symmetrical plane through their median axis, whereby connecting members of the swinging arms engage control slots of the control pot, which swinging arms and control slots are disposed in the symmetry plane.

It is another object of the present invention to provide a hydrostatic torque converter, wherein each of the swinging bodies has two swinging arms disposed obliquely to a symmetrical plane disposed through their median axis, whereby connecting members of the swinging arms engage control slots of the control pot, which control slots are laterally displaced from the center plane. By this arrangement the control slots, serving the operation of the two swinging bodies of the pump—and of the motor member, can be designed longer and accordingly with smaller angles of inclination, than would be possible, in the case of use of swinging bodies with swinging arms and control slots disposed in the symmetry plane, because the latter could otherwise intercept each other. Thus, in particular, in smaller torque converters, equipped with a pure mechanical, manual adjustment, the required manual forces are markedly reduced and a high adjustment exactness first of all in the neighborhood of a transmission ratio 1:∞ for the idling is brought about.

It is still another object of the present invention to provide a hydrostatic torque converter, in which the adjustment movement can be transmitted in axial direction to the control pot rotating jointly with the rotary housing such that the control pot has two outwardly projecting flanges for the playfree reception of the outer rings of two ball and roller bearings, disposed at the ends of an adjustment fork. The use of conventional ball and roller bearings with small diameters for the friction-less transmission of the adjustment movement of a forked selector lever swingably disposed in an immovable drive housing onto the control pot amounts to a space-saving and simultaneously economical solution of the problem of the present invention.

It is yet another object of the present invention to provide a hydrostatic torque converter, wherein the control disc comprises three parts, namely a central shaft made of hardened steel, which serves simultaneously as bearing for the piston drums, a ring body preferably made of bronze, which has sliding faces for the piston drums, control slots and connecting channels for the pressure fluid, and an outer ring made of steel, which forms the connection to the rotary housing consisting preferably of halves of spherical moldings. In such arrangement of the control discs of three main constructive parts, the individual parts can be adjusted in a nearly ideal manner by selection of the best suitable working material for each part to the special requirements with simultaneously most economical use of comparatively expensive special metal.

It is also another object of the present invention to provide a hydrostatic torque converter, wherein the center shaft forming the core of the control disc is designed advantageously such that the ends of the shaft extending on both sides from the annular parts of the control disc have a ratio of length to diameter, which is larger than 1:1. By this selection of the length to diameter ratio, a high rigidity of the piston drum bearings is brought about and, thereby, the operational life of the sliding faces between the control disc and the end faces of the piston drums is appreciably increased.

It is also a further object of the present invention to provide a hydrostatic torque converter, wherein the hollow holding shaft, supporting the piston drum of the axial piston motor against rotation and extending from the rotary housing and simultaneously serving for the feeding of the filling and lubricating fluid into the hydrostatic torque converter, has at its inner end a safety valve limiting the filling pressure and forming simultaneously a sealing connection to the center shaft of the control disc and at its outer end a pressure-tight and a rotary-safe connection for the filling fluid containing simultaneously the axial pressure spring for the piston drum. Such arrangement of the holding shaft for the support of the piston drum of the fluid motor against rotation makes possible an extremely operation-safe and loss-free feeding of the fluid quantity, which has to be fed continuously into the torque converter as a replacement of working fluid escaping due to unavoidable sealing leaks from the inner fluid cycle. The arrangement of the safety valve combined with the sealing between the immovable holding shaft and the rotating shaft of the control disc inside of the hollow holding shaft brings about simultaneously an appreciable simplification and time economy for the assembly of the converter. It is namely possible to insert the holding shaft in its already premounted state from the outside into the central opening on the drive end side of the rotary housing and can be inserted during the assembly of the housing parts with its notched gearing disposed on its inner end into a corresponding inner gearing provided on the motor piston drum.

It is yet another object of the present invention to provide a hydrostatic torque converter, wherein the entire converter is maintained in the housing by means of a deep groove ball bearing, preferably disposed at its forward end, against longitudinal movements, which bearing serves simultaneously as a radial support. By this arrangement, the incorporation of the converter in the drive housing is appreciably simplified, since due to the axial holding of the converter on one end only, the second radial bearing, formed as a loose bearing, at the other end, has to slide merely into the receiving bore during the assembly.

It is furthermore an object of the present invention to provide a hydrostatic torque converter, wherein the pistons guided longitudinally in the piston drums comprise solid material. The use of massive pistons, instead of conventional hollow pistons, is in this case of advantage, because the centrifugal forces affecting the pistons of the fluid motor during operation have a comparatively low lateral face load due to the small piston diameter and the short distance from the rotary axis, while, due to the elimination of the boring operation and the simplified hardening, appreciable savings can be obtained.

With these and other objects in view, which will become apparent in the following detailed description, the present invention will be clearly understood in connection with the accompanying drawings, in which:

FIG. 5 is an axial section of another embodiment of a hydrostatic torque converter wherein the axial piston pump and the axial piston motor have different dimensions.

Figure 1:
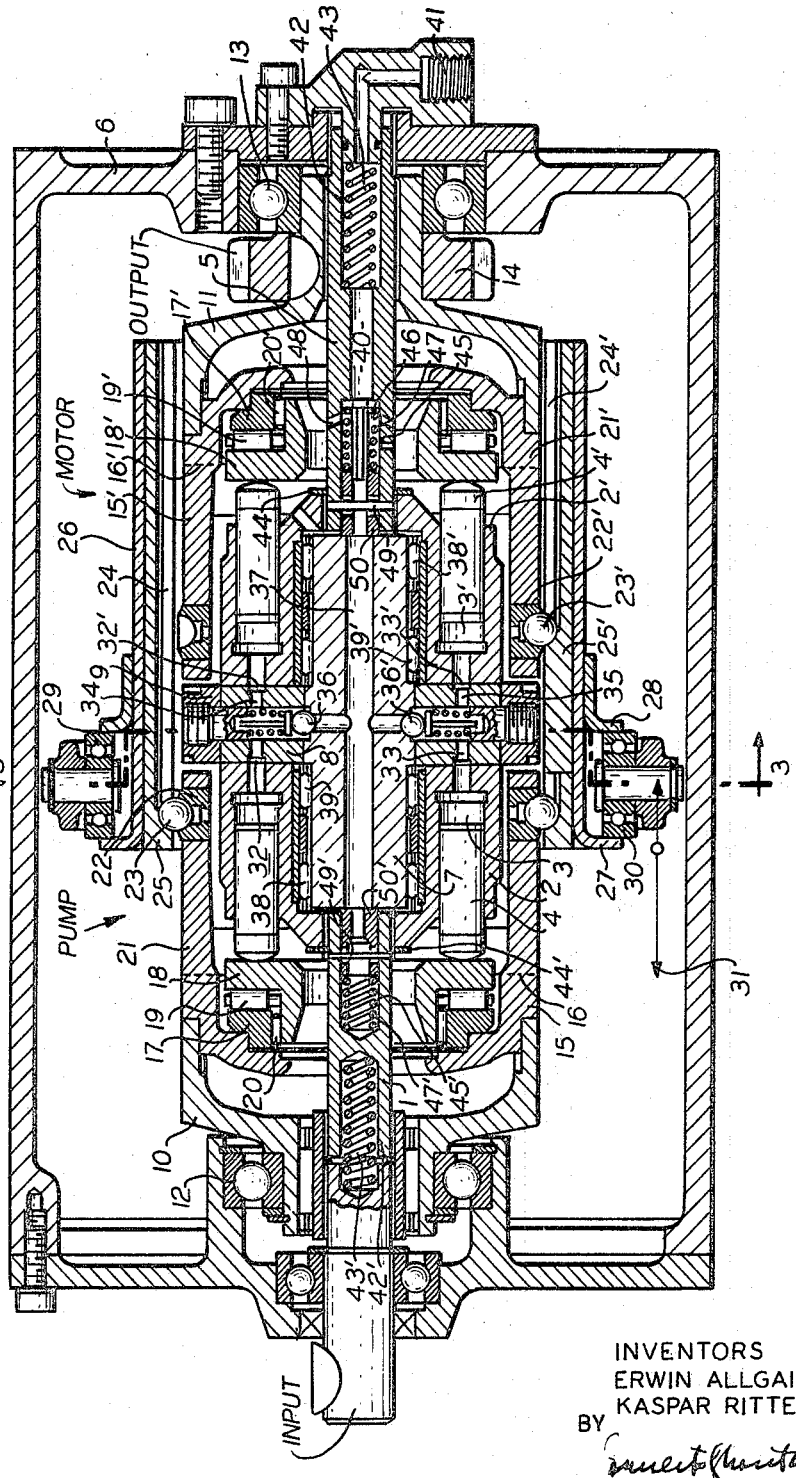
FIGURE 1 is a axial section of a hydrostatic torque converter, designed in accordance with the present invention.
Figure 2:
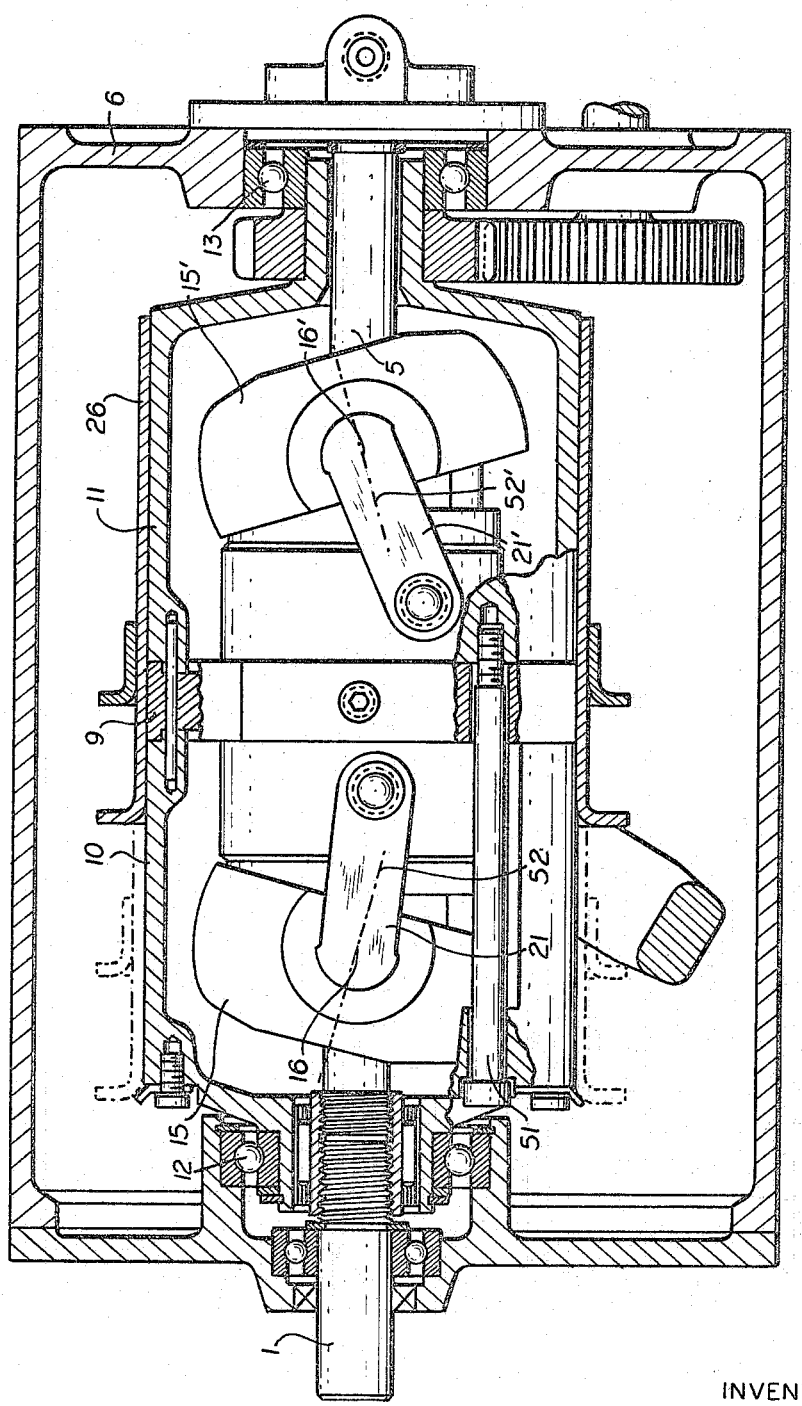
FIG. 2 is an axial section of the torque converter disclosed in FIG. 1, yet in a position 90° set off thereto.
Figure 3:
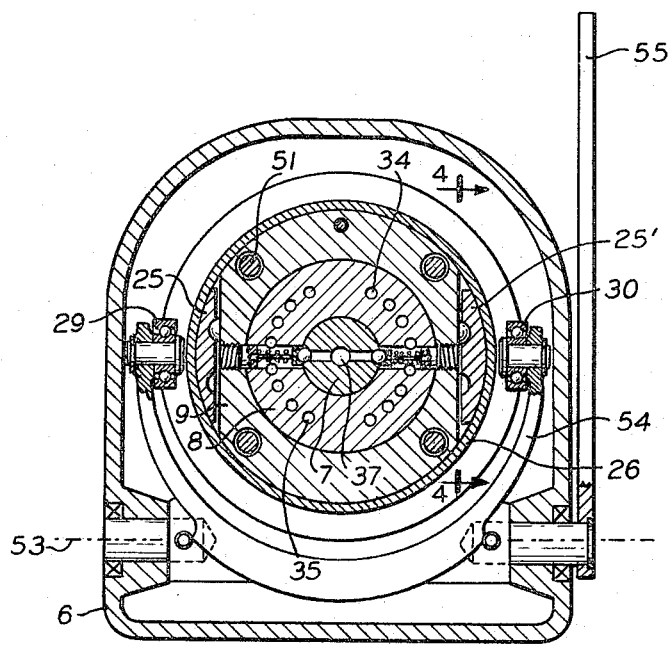
FIG. 3 is a section along the lines 3—3 of FIG. 1.
Figure 4:
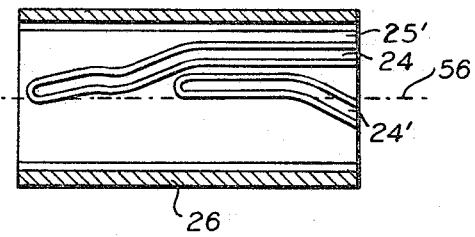
FIG. 4 is a fragmentary section along the lines 4—4 of FIG. 3.

Referring now to the drawings, and in particular to FIGS. 1–4, the torque converter, designed in accordance with the present invention, comprises, as main structural elements, an input shaft 1 and an axial piston pump consisting of a piston drum 2 and massive pistons 4 reciprocating in bores 3 of the piston drum 2 and further comprises equal parts disposed in an image arrangement, namely an axial piston motor consisting of a piston drum 2′ and massive pistons 4′ reciprocating in bores 3′ of the piston drum 2′. The piston drum 2′ is supported against rotation by means of a holding shaft 5 relative to a housing 6 enclosing the converter. A multi-part control disc is disposed between the piston drums 2 and 2′.

The control disc comprises a shaft 7, an annular body 8 and an outer ring 9. The outer ring 9 of the control disc forms jointly with housing-parts 10 and 11, which are connected together by means of screws 51, a rotary housing, which is rotatably mounted in the housing 6 by means of an axially immovable deep groove ball bearing 12 and a loose bearing 13 and is equipped with an output pinion 14. Swinging bodies 15 and 15′, respectively, are mounted for a swinging movement about the axes 16 and 16′, respectively, in the housing parts 10 and 11, respectively, of the rotary housing. Axial bearings 17, 18 and 17′, 18′, respectively, are disposed in the swinging bodies 15 and 15′, respectively. The rotating rings 18 and 18′, respectively, of the axial bearings, serving simultaneously as abutments for the pistons 4 and 4′, respectively, are supported by roller-thrust-bearings 19 and 19′, respectively, and radial needle bearings 20 and 20′, respectively, relative to the immovable rings 17 and 7′, respectively.

Each of the swinging bodies 15 and 15′, respectively, is equipped with two swinging arms 21 and 21′, respectively, which are disposed obliquely relative to a symmetry plane extending through the center axes 52 and 52′, respectively, of the swinging bodies 15 and 15′, respectively, and which are equipped with adjustable connecting members, formed for instance, as balls 23 and 23′, respectively, by means of screwed-in bushings 22 and 22′, respectively. These connecting balls 23 and 23′, respectively, penetrate into control slots 24 and 24′, respectively, laterally displaced from the center plane 56 (FIG. 4), which control slots 24 and 24′, respectively, are worked in reinforced portions 25 and 25′, respectively, of a control pot 26 longitudinally guided on the rotary housings 9, 10 and 11. The control pot 26 has two outwardly projecting flanges 27 and 28 between which bearings 29 and 30, respectively, are arranged for the transmission of longitudinal movements onto the rotating control pot 26 by movement of a fork member 54 swingably mounted in the housing 6 about the axis 53 and which fork member 54 is equipped with an outside disposed selection lever 55 for turning in one or the other direction of the double-arrow 31 (FIG. 1). Kidney-shaped control grooves 32 and 32′, respectively, are provided for the suction side and control grooves 33 and 33′, respectively, for the pressure side in the ring body 8 of the control discs 7, 8 and 9, which is preferably made of bronze, which control grooves are in communication with each other by a plurality of channels 34 and 35, respectively, extending through the control disc. Furthermore, the ring body 8 contains valves 36 and 36′, respectively, which permit entrance of fluid fed through the bore 37 of the shaft 7 to the control slots of the suction side of the converter, while they lock automatically the escape of working fluid from the pressure side.

The shaft 7, forming the center portion of the control disc, extends on both sides beyond the disc so far that its ends form bearing pins having a ratio of length to diameter which is greater than 1 for the needle bearings 38, 39 and 38′, 39′, respectively, supporting with great exactness the piston drums 2 and 2′, respectively. The holding shaft 5 is equipped with a central bore 40, through which the liquid is fed from the outside by means of a branch 41 from a filling pump (not shown) at a pressure of, for instance, about 6 atmospheres continuously into the torque converter. A helical spring 43 is provided in the widened outer bore end of the holding shaft 5, which spring 43 abuts the fluid feeding branch 41 and exerts an elastic preliminary tension force over a holding ring 44 onto the pump piston drum 2′.

An enlargement 45 on the inner end of the bore 40 opposite the shaft 7 in the holding shaft 5 serves the reception of a safety valve which comprises a hollow-bored differential pressure slide 46 and a pretensioned pressure spring 47, which maintains the slide 46 in its right end position upon lack of filling pressure. During the operation of the torque converter, the slide 46 is displaced towards the left by the entering filling fluid with partial release thereof through the radial bores 48, so that a nearly constant filling pressure is maintained behind the slide 46 which constant filling pressure is determined by the characteristic of the spring 47. With its left end the pressure spring 47 abuts a bushing 50 movable longitudinally in the enlargement 45, but retained against rotation by means of a pin 49, which bushing 50 serves the purpose of feeding in a seal-tight manner the filling fluid from the holding shaft 5 into the bore 37 of the shaft 7.

FIG. 1 shows the axial piston pump and the axial piston motor in their zero displacement positions, and the selection lever 55 is at that time in its neutral position. By swinging the selection lever 55 in one or the other direction, due to the control slots 24 and 24′, the pump motor displacement is adjusted such that a forward or reverse drive is brought about.

Referring now again to the drawings, and in particular to FIG. 5, the embodiment disclosed in this figure is designed substantially identical with the above-described embodiment which is disclosed in FIGS. 1 to 4. This second embodiment comprises the same main structural elements, namely an input shaft 1a and an axial piston pump consisting of a piston drum 2a and massive pistons 4a reciprocating in bores 3a of the piston drum 2a and further comprises similar parts, but of larger dimensions, namely an axial piston motor consisting of a piston drum 2a′ and massive pistons 4a′ reciprocating in bores 3a′ of the piston drum 2a′. The piston drum 2a′ is supported against rotation by means of a holding shaft 5a relative to a housing (not shown) enclosing the converter. A multi-part control disc is disposed between the piston drums 2a and 2a′.

The control disc comprises in this embodiment again a shaft 7a and an annular body 8a. Housing parts 10a and 11a are provided and constitute a rotary housing, which is rotatably mounted in a housing (not shown) and which is equipped with an output pinion 14a. Swinging bodies 15a and 15a′, respectively, are mounted for a swinging movement about the axes 16a and 16a′, respectively, in the housing parts 10a and 11a, respectively, of the rotary housing. It is quite apparent that the swinging body 15a' has larger dimensions than that of the swinging body 15a. Axial bearings 17a, 18a and 17a', 18a', respectively, are disposed in the swinging bodies 15a and 15a', respectively. Rotating rings 18a and 18a', respectively, of the axial bearings, serving simultaneously as abutments for the pistons 4a and 4a', respectively, are supported by roller-thrust-bearings 19a and 19a', respectively, and radial needle bearings 20a and 20a', respectively, relative to the immovable rings 17a and 17a', respectively.

Each of the swinging bodies 15a and 15a' is equipped with two swinging arms, which are equipped with adjustable connecting members, formed for instance, as balls 23a and 23a', respectively, by means of screwed-in bushings 22a and 22a'. The connecting balls 23a and 23a' penetrate into control slots 24a', which control slots 24a' are worked in reinforced portions 25a' of a control pot 26a longtiudinally guided on the rotary housing. The control pot 26a has two outwardly projecting flanges 27a and 28a between which bearings (not shown) are arranged for the transmission of longitudinal movements onto the rotating control pot 26a by means clearly described in connection with the first embodiment.

Control grooves 32a and 32a', respectively, are provided for the suction side and control grooves 33a and 33a', respectively, for the pressure side in the ring body 8a, which is preferably made of bronze, which control grooves are in communication with each other by a plurality of channels 34a and 35a, respectively, extending through the control disc. The ring body 8a contains valves 36a and 36a', respectively, which permit entrance of fluid fed through a bore 37a of the shaft 7a to the control slots of the suction side of the converter, while they lock automatically the escape of working fluid from the pressure side.

The shaft 7a, forming the center portion of the control disc extends on both sides beyond the disc so far that its ends form bearing pins for the needle bearings 38a, 39a and 38a', 39a', respectively, supporting with great exactness the piston drums 2a and 2a', respectively. The holding shaft 5a is equipped with a central bore 40a, through which the liquid is fed from the outside by means of a feeding bore 41a from a filling pump (not shown at a proper pressure, merely by example of 6 atmospheres continuously into the torque converter.

An enlargement 45a on the inner end of the bore 40a opposite the shaft 7a in the holding shaft 5a serves the reception of a safety valve which comprises a hollow-bored differential pressure slide 46a and a pretensioned pressure spring 47a, which maintains the slide 46a in its right end position upon lack of filling pressure. During the operation of the torque converter, the slide 46a is displaced towards the left by the entering filling fluid with partial release thereof through radial bores 48a, so that a nearly constant filling pressure is maintained behind the slide 46a, which constant filling pressure is determined by the characteristic of the spring 47a. With its left end the pressure spring 47a abuts a bushing 50a movable longitudinally in the enlargement 45a, but retained against rotation by means of a pin 49a, which bushing 50a serves the purpose of feeding in a seal tight manner the filling fluid from the holding shaft 5a into the bore 37a of the shaft 7a.

While we have disclosed one embodiment of the present invention, it is to be understood that this embodiment is given by example only and not in a limiting sense, the scope of the present invention being determined by the objects and the claims.

We claim:
1. A hydrostatic torque converter, comprising
an axial piston pump,
an axial piston motor,
a control disc disposed between said piston pump and said piston motor,
said piston pump and said piston motor being disposed on opposite sides of said control disc,
a rotary housing receiving said piston pump, said piston motor and said control disc,
said piston pump and said piston motor including swinging bodies,
a control pot guided by said rotary housing for axial movement,
said swinging bodies being swingably mounted in said rotary housing by means of said control pot,
each of said swinging bodies having further two swinging arms,
said swinging arms including connecting means,
said control pot having control slots, and
said connecting means engaging said control slots.

2. A hydrostatic torque converter, comprising
an axial piston pump,
an axial piston motor,
a control disc disposed between said piston pump and said piston motor,
said piston pump and said piston motor being disposed on opposite sides of said control disc,
a rotary housing receiving said piston pump, said piston motor and said control disc,
said piston pump and said piston motor including swinging bodies,
a control pot guided by said rotary housing for axial movement.
said swinging bodies being swingably mounted in said rotary housing by means of said control pot,
each of said swinging bodies having further two swinging arms disposed obliquely relative to a symmetrical plane extending through a median axis,
said swinging arms including connecting means,
said control pot having control slots displaced laterally from the center plane, and
said connecting means engaging said control slots.

3. The hydrostatic torque converter, as set forth in claim 1, wherein
said control pot has two outwardly extending flanges,
an outer housing,
a setting fork pivotally mounted mounted in said outer housing,
bearings having outer rings supported by the free ends of said setting fork, and
said flanges receiving said outer rings of said bearings.

4. The hydrostatic torque converter, as set forth in claim 1, wherein
said control disc comprises three parts,
a central shaft of hardened steel, constituting the first of said three parts, said central shaft serving simultaneously for the mounting of piston drums,
a ring body having sliding faces for the said piston drums and said control slots, as well as connecting channels for the pressure fluid, said ring body constituting the second of said three parts, and
an outer ring of steel forming the connection for halves of said rotary housing, said outer ring constituting the third of said three parts.

5. The hydrostatic torque converter, as set forth in claim 4, wherein
the ends of said central shaft projecting at both ends from annular parts of said control disc have a ratio of their length to their diameter which is greater than 1:0.

6. The hydrostatic torque converter, as set forth in claim 1, which includes
a holding shaft supporting a piston drum of said axial piston drum against rotation and projecting from said rotary housing, and simultaneously feeding filling and lubricating fluid into said torque converter,
said holding shaft including at its inner end a safety valve limiting the filling pressure and forming simultaneously a sealing connection to a central shaft of said control disc and at its outer end a pressure-proof connection for said filling fluid,
an axial pressure spring for said piston drum, and
said connection supporting said axial pressure spring.

7. The hydrostatic torque converter, as set forth in claim 1, which includes
a deep groove ball bearing retaining said torque converter in said housing and simultaneously providing radial support.

8. The hydrostatic torque converter, as set forth in claim 1, wherein
said piston pump and said piston motor include a piston,
piston drums in which said pistons reciprocate, and
said pistons are of solid material.

9. The hydrostatic converter, as set forth in claim 1, wherein
said axial piston pump has a smaller piston drum than that of said axial piston motor, and
said rotary housing has a smaller diameter within the range of said axial piston pump and a larger diameter within the range of said axial piston motor.

References Cited by the Examiner

UNITED STATES PATENTS

| 1,840,873 | 1/1932 | Rayburn | 60—53 |
| 3,131,540 | 5/1964 | Ritter | 60—53 |
| 3,175,365 | 3/1965 | Allgaier et al. | 60—53 |

EDGAR W. GEOGHEGAN, *Primary Examiner*.